March 11, 1952 — C. L. MOORE — 2,589,017
PATTERN LATHE
Filed April 16, 1951 — 3 Sheets-Sheet 2
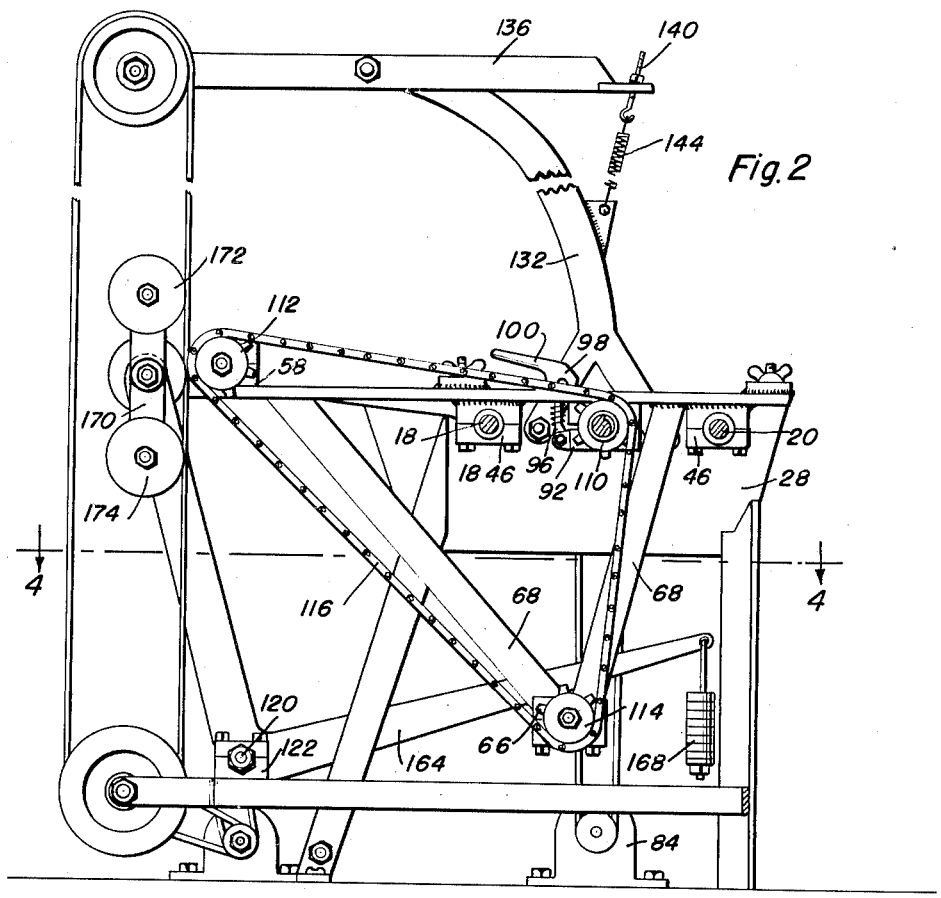
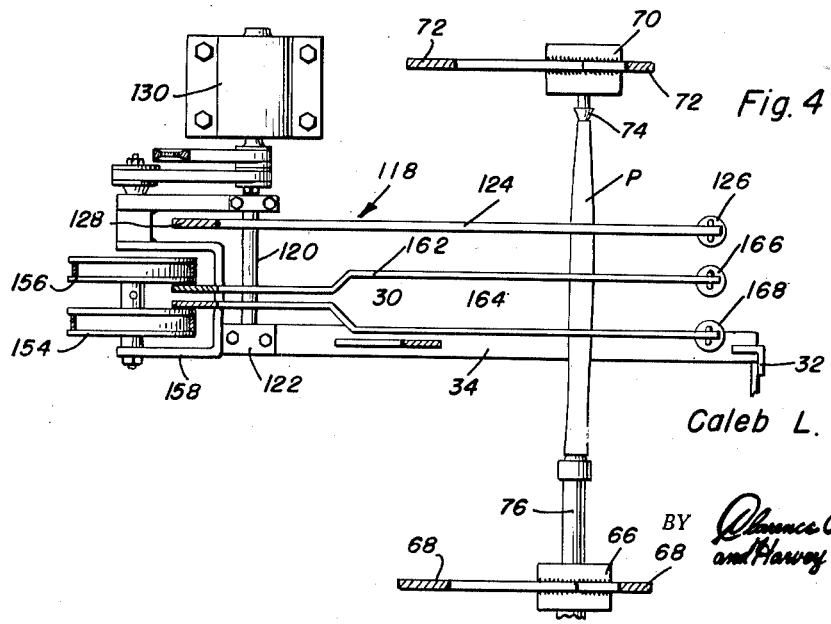
Caleb L. Moore
INVENTOR.

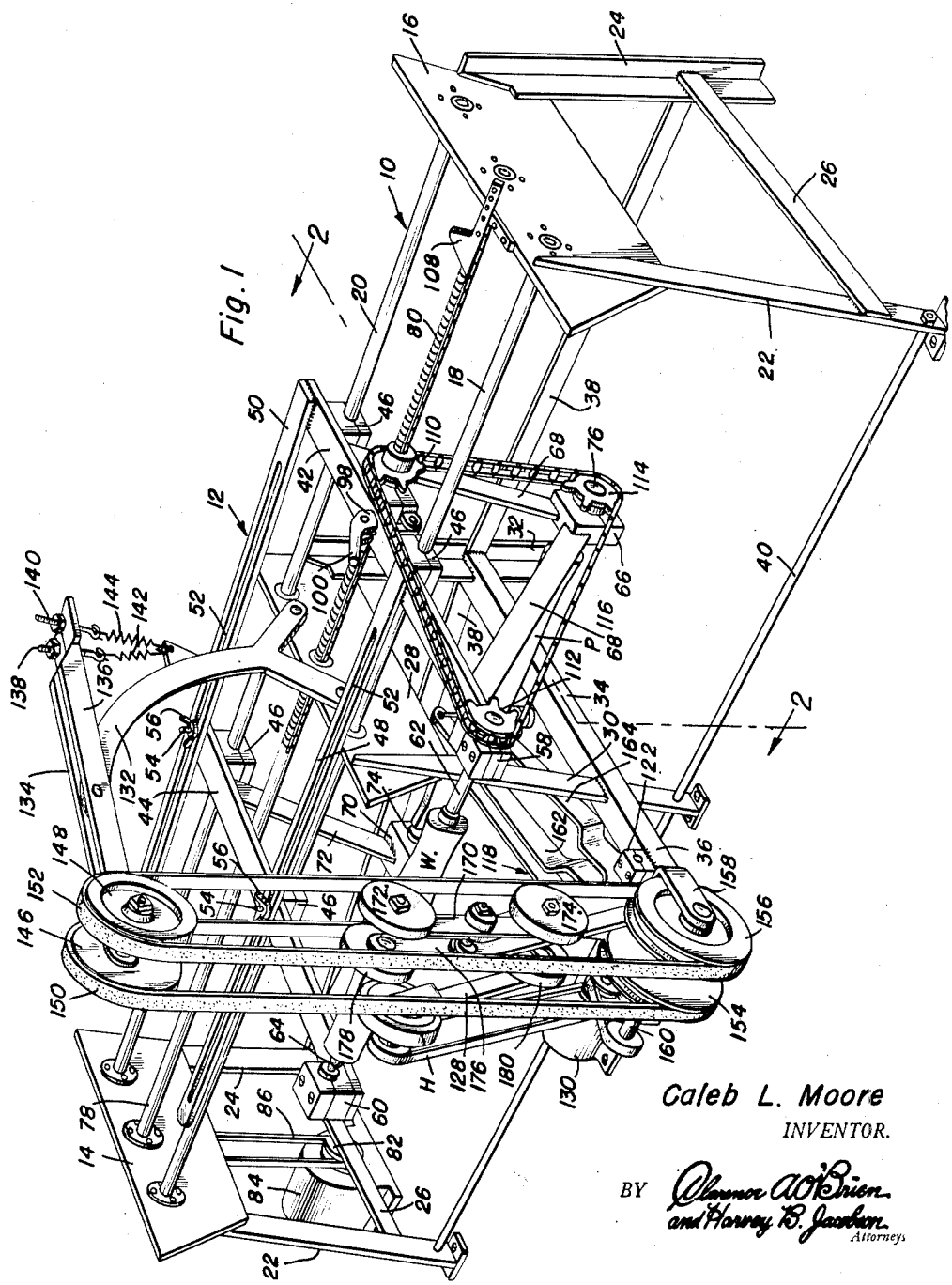

March 11, 1952     C. L. MOORE     2,589,017
PATTERN LATHE
Filed April 16, 1951     3 Sheets-Sheet 3
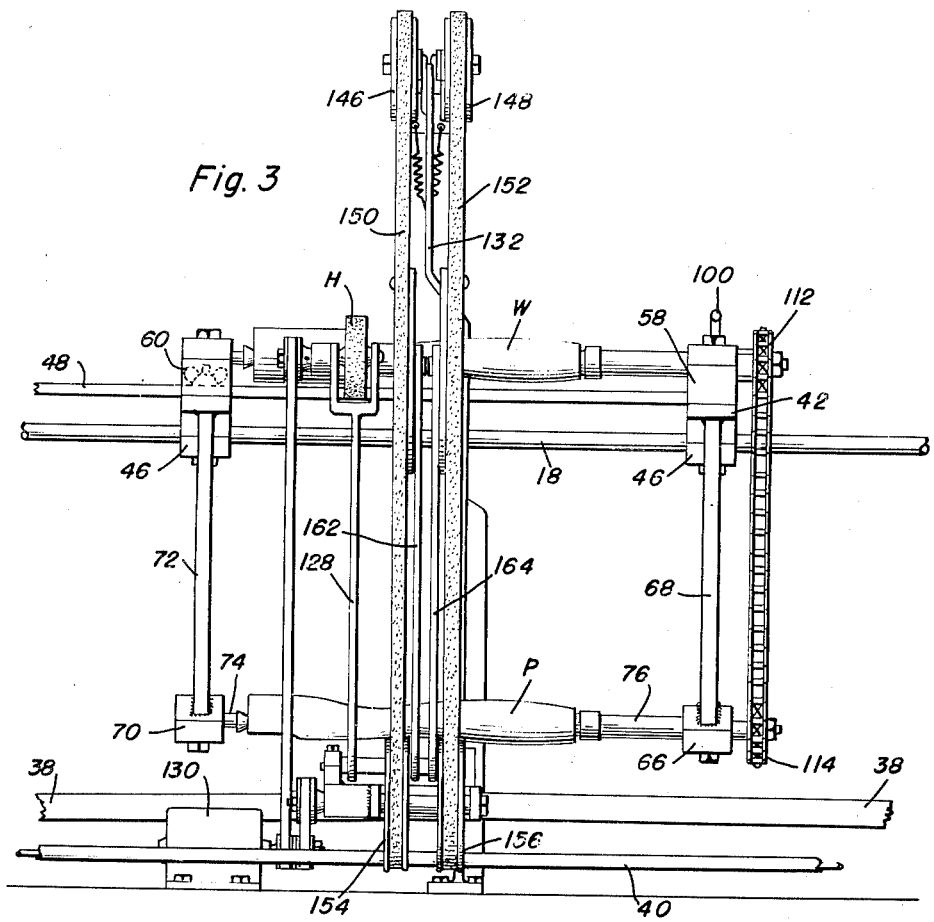
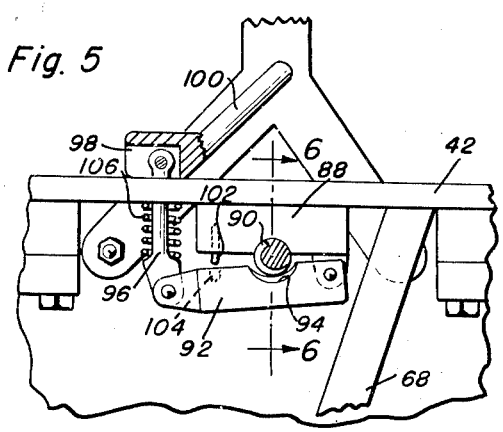
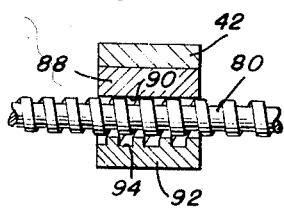
Caleb L. Moore
INVENTOR.
BY *Clarence A. O'Brien
and Harvey B. Jacobson*
Attorneys Patented Mar. 11, 1952

2,589,017

UNITED STATES PATENT OFFICE 2,589,017

PATTERN LATHE

Caleb L. Moore, Roanoke Rapids, N. C., assignor of ten per cent to Fred A. Bright, ten per cent to Fannie M. Bright, five per cent to Eloise B. Tritt, and five per cent to Elvin D. Tritt, all of Roanoke Rapids, N. C.

Application April 16, 1951, Serial No. 221,275

12 Claims. (Cl. 51—144)

This invention relates to new and useful improvements in lathe machines and the primary object of the present invention is to provide a pattern lathe wherein an article of work will be shaped to the contour of a form or pattern supported on a part of the lathe.

Another important object of the present invention is to provide a pattern lathe including a movable carriage supporting a form and a work piece in parallel relation together with a bellcrank mounted for vertical swinging movement on the frame with one leg portion resting against the form and with its other leg portion supporting a sanding head that will engage the work piece as the carriage is moved laterally of the bellcrank.

Yet another object of the present invention is to provide a pattern lathe of the aforementioned character including a power driven screw for moving the carriage and means connecting the screw to a form holder and work piece for rotating the same as a unit.

A further object of the present invention is to provide a pattern lathe involving endless abrasive belts for engaging a work piece and means responsive to the swinging of the bellcrank and the shape of the form for tensioning the belts as they engage the work piece.

A still further aim of the present invention is to provide a lathe of the aforementioned construction that is extremely simple and practical in structure, efficient and durable in operation, inexpensive to manufacture and service, and otherwise well adapted for the purposes for which the same is intended.

Other objects and advantages reside in details of construction and operation as more fully hereinafter described and claimed, reference being had to the accompanying drawings forming part hereof, wherein like numerals refer to like parts throughout, and in which:

Figure 1 is a perspective view of the present invention in use;

Figure 2 is a transverse vertical sectional view taken substantially on the plane of section line 2—2 of Figure 1;

Figure 3 is a fragmentary front elevational view of Figure 1;

Figure 4 is a horizontal sectional view taken substantially on the plane of section line 4—4 of Figure 2;

Figure 5 is an enlarged detail sectional view showing the manner in which the carriage moving screw is operatively connected to the carriage; and Figure 6 is a vertical sectional view taken substantially on the plane of section line 6—6 of Figure 5.

Referring now to the drawings in detail, wherein for the purpose of illustration, there is disclosed a preferred embodiment of the present invention, the numerals 10 and 12 represent the frame and carriage respectively, a detail description of which now follows:

Frame

The frame 10 comprises a pair end plates 14 and 16 that are connected by a pair of spaced parallel, horizontal bars 18 and 20 whose ends are suitably secured to the plates 14 and 16. The plates 14 and 16 are supported by forward and rear legs 22 and 24 with the forward legs connected to the rear legs by braces 26.

An intermediate support forms part of the frame 10 and consists of a plate 28 having reinforced openings that accommodate the bars 18 and 20. The plate 28 is supported by forward and rear legs 30 and 32 that are connected together by a horizontal angle member 34 having a forward extension 36 for a purpose later to be described.

The legs 24 are connected to the leg 32 by longitudinal straps 38 whose ends are fixed by welding or the like to the legs, and the legs 22 and 30 are connected by a longitudinal rod 40 whose ends are suitably secured to the legs.

Carriage

The carriage 12 comprises an open adjustable framework composed of spaced parallel transverse bars 42 and 44 that carry bearings 46. The bearings 46 are formed of two separable halves that slidably receive the bars 18 and 20.

A pair of longitudinally extending bars 48 and 50 are fixed at one of their ends to the bar 42. The bars 48 and 50 are formed with elongated slots 52 that receive bolts 54 rising from the bar 44. Nuts 56 are threaded on the bolts 54 to adjust the bars 42 and 44 relative to each other to accommodate patterns and work pieces of various lengths.

A work holder forms part of the carriage and consists of two bearing units 58 and 60 that are secured to the forwardly extending ends of the bars 42 and 44 respectively. The bearing unit 58 carries a live center 62 whereas the bearing unit 60 carries a dead center 64.

A lower bearing unit 66 is secured to the bar 42 by straps or hangers 68 and coacts with another lower bearing unit 70 secured to the bar 44 by hangers 72 to form a pattern or mandrel holder. A dead center 74 is mounted on bearing unit 70 and a live center 76 is mounted on the bearing unit 66.

Carriage moving means

Means is provided for moving the carriage on the bars 18 and 20 between the end plates 14 and 16. This means consists of a horizontal rod 78 that parallels the bars 18 and 20, and which is located between the bars 18 and 20. The rod or screw 78 is rotatably supported in bearings mounted on the plates 14, 16 and 28 and the right end portion of the rod 78 is threaded, as at 80, when viewing Figure 1.

One end of the rod 78 carries a pulley (not shown) that is connected to a pulley 82 on the drive shaft of a motor 84 by a pulley belt 86 whereby the feed screw 78 will be rotated.

As illustrated in Figures 5 and 6, the carriage and specifically the bar 42 supports a block 88 having a smooth surfaced concave recess 90 for receiving the upper periphery of a portion of the rod 78. A retainer arm 92 is hinged to the under-surface of the block 88 for vertical swinging movement and is formed with an internally threaded recess 94 receiving the lower periphery of the rod 78.

The free end of the arm 92 is pivoted to a vertically slidable rod 96 carried by the bar 42. The upper end of the rod 96 is pivoted to the cam portion 98 of a lever 100 whereby the rod 96 may be raised to move the arm 92 upwardly against the block 88 so that the carriage will move as the rod 78 is rotated. The block 88 carries a depending pin 102 that will enter a recess 104 in the arm 92 to center the arm 92 relative to the block 88 when the arm is raised. A spring 106 surrounds the rod 96 and is biased between the underside of the carriage and the enlarged lower end of the rod 96 to urge the rod 96 and arm 92 downwardly.

Carriage arrester

A stop or cam member 108 is secured to the end plate 16 and will engage and swing the lever 100 as the carriage moves to the right to force the arm 92 downwardly out of engagement with the rod 78 whereby movement of the carriage by the power means 84 is prevented.

Form holder and work holder driving means

A sprocket 110 is rotatably supported on the carriage and includes an internally threaded hub that receivably engages the threaded portion 80. The sprocket 110 is connected to sprockets 112 and 114 on the live centers 62 and 76 respectively, by a sprocket chain 116.

The sprockets 110, 112 and 114 are of such a size as to permit the live centers 62 and 76 to rotate at exactly the same speed in order to properly shape the article of work W held by the centers 62 and 64 in accordance with the contour of the form or pattern P held by the centers 74 and 76.

Tool holder and form engager

The apex of a bellcrank 118 is mounted for vertical swinging movement on a horizontal shaft 120 carried by a bearing 122 on the extension 36. The lower leg portion 124 of the bellcrank 118 carries a weight 126 that urges the leg portion against the form P and the other leg portion 128 of the bellcrank 118 is bifurcated to rotatably support a tool or sanding head H that is urged against the work W.

A motor 130 is operatively connected to the sanding head H to rotate the latter against the work as the bellcrank 118 rocks about its pivot in response to the contour of the form P.

Sanding belts

The bifurcated end of an arch 132 is fixed to the plate 28 and supports a pair of spaced parallel rock arms 134 and 136 whose rear ends are secured, adjustably, to the arch 132 by fasteners 138 and 140 and springs 142 and 144.

The forward ends of the arms 134 and 136 rotatably support an upper pair of pulleys 146 and 148 about which abrasive belts 150 and 152 are trained. The belts 150 and 152 are also trained about a lower pair of pulleys 154 and 156 supported on the furcations of a bifurcated member 158 carried by the extension 36.

Motor 130 is operatively connected to the shaft 160 supporting the pulleys 154 and 156 so that the belts 150 and 152 will be rotated by the motor 130.

Tensioning means for the abrasive belts

Means is provided for tensioning the belts 150 and 152 individually so that the same may move into engagement with the work W. This means comprises a pair of bellcranks 162 and 164 whose lower leg portions extend over and across the form P and which are urged against the form P by weights or the like 166 and 168.

The upper leg portion of the bellcrank 162 is pivoted to the central portion of an elongated plate 170 whose ends rotatably support disks 172 and 174. The upper leg portion of the bellcrank 164 is pivoted to the central portion of an elongated plate 176 whose ends rotatably support disks or rollers 178 and 180. The disks 172 and 174 engage the inner vertical flight of belt 152 above and below the work W and the disks 178 and 180 engage the inner vertical flight of the belt 150 above and below the work W.

Operation

In practical use of the present invention, the carriage, being disposed at the left end of the frame, the form P is placed between the centers 74 and 76 while the work W is placed between the centers 62 and 64. The bar 44 is moved toward the bar 42 until the work and form are held between their holding centers and then the wing nuts 56 are tightened.

As the motors 84 and 130 are started, the carriage 12 will move to the right with the lower leg portions of the bellcranks 118, 162 and 164 riding downwardly against the form or mandrel P.

The grinding wheel H rides against the work W to shape the work and the wheel H is moved toward and away from the work in response to swinging of the bellcrank 118 due to the shape of the form P.

Since the lower leg portions of the bellcranks 162 and 164 ride against the form P the disks 172, 174, 178 and 180 will engage the belts and urge the belts against the work and provide the desirable finish to the work.

When the work has been processed by the grinding head H and the abrasive belts 150 and 152, the lever 100 will engage the stop 108 to urge the lever 100 to a position whereby the arm 92 will be moved downwardly from the feed screw 78, 80 to stop movement of the carriage.

Having described the invention, what is claimed as new is:

1. A pattern lathe comprising a frame including a pair of horizontal guide bars, a carriage slidably mounted on the bars, a power driven screw rotatably supported on the frame and paralleling the bars, a member mounted on the carriage receivably engaging the screw to permit movement of the carriage on the bars during rotation of the screw, a work holder including a live center mounted on the carriage, a form holder including a live center also mounted on the carriage, means operatively connecting the live centers to the screw and together, a vertically swingable bellcrank mounted on the frame and including a leg portion extending across and against a form held by the form holder, and a power driven tool carried by the other leg portion of said bellcrank and engaging a work piece carried by the work holder.

2. A pattern lathe comprising a frame including a pair of horizontal guide bars, a carriage slidably mounted on the bars, a power driven screw rotatably supported on the frame and paralleling the bars, a member mounted on the carriage receivably engaging the screw to permit movement of the carriage on the bars during rotation of the screw, a work holder including a live center mounted on the carriage, a form holder including a live center also mounted on the carriage, means operatively connecting the live centers to the screw and together, a vertically swingable bellcrank mounted on the frame and including a leg portion extending across and against a form held by the form holder, a plurality of, endless, rotatable belts including inner vertical flights adapted to engage a work piece mounted on the work holder, means carried by the frame rotatably supporting the belts, and tensioning means for the belts.

3. A pattern lathe comprising a frame including a pair of horizontal guide bars, a carriage slidably mounted on the bars, a power driven screw rotatably supported on the frame and paralleling the bars, a member mounted on the carriage receivably engaging the screw to permit movement of the carriage on the bars during rotation of the screw, a work holder including a live center mounted on the carriage, a form holder including a live center also mounted on the carriage, means operatively connecting the live centers to the screw and together, a vertically swingable bellcrank mounted on the frame and including a leg portion extending across and against a form held by the form holder, a plurality of, endless, rotatable belts including inner vertical flights adapted to engage a work piece mounted on the work holder, means carried by the frame rotatably supporting the belts, and resilient means engaging the belt supporting means and tensioning the belts.

4. A pattern lathe comprising a frame including a pair of horizontal guide bars, a carriage slidably mounted on the bars, a power driven screw rotatably supported on the frame and paralleling the bars, a member mounted on the carriage receivably engaging the screw to permit movement of the carriage on the bars during rotation of the screw, a work holder including a live center mounted on the carriage, a form holder including a live center also mounted on the carriage, means operatively connecting the live centers to the screw and together a vertically swingable bellcrank mounted on the frame and including a leg portion extending across and against a form held by the form holder, a lower pair of pulleys rotatably supported on the frame in side by side relation, a supporting arm secured to the frame, a vertically swingable beam carried by the arm, an upper pair of side by side pulleys rotatably supported on the beam, abrasive belts trained over the upper and lower pulleys, means connected to the beam for retaining the beam in a predetermined position about its pivot, and a tool carried by the other leg portion of said bellcrank for engaging a work piece carried by the work holder.

5. A pattern lathe comprising a frame including a pair of horizontal guide bars, a carriage slidably mounted on the bars, a power driven screw rotatably supported on the frame and paralleling the bars, a member mounted on the carriage receivably engaging the screw to permit movement of the carriage on the bars during rotation of the screw, a work holder including a live center mounted on the carriage, a form holder including a live center also mounted on the carriage, means operatively connecting the live centers to the screw and together, a vertically swingable bellcrank mounted on the frame and including a leg portion extending across and against a form held by the form holder, a lower pair of pulleys rotatably supported on the frame in side by side relation, a supporting arm secured to the frame, a vertically swingable beam carried by the arm, an upper pair of side by side pulleys rotatably mounted on the beam, abrasive belts trained over the upper and lower pulleys, a spring secured to said arm and adjustably connected to the beam for resiliently adjusting the beam about its pivot, and a tool carried by the other leg portion of said bellcrank for engaging a work piece carried by the work holder.

6. The combination of claim 4, and means responsive to swinging of the bellcrank for tensioning the belts.

7. The combination of claim 6, wherein said belt tensioning means includes upper and lower disks contacting the belts, said disks being supported by the said other leg portion of said bellcrank.

8. In a wood working machine including a frame and a horizontally movable carriage slidably mounted on the frame and including means for supporting a form and a work piece in spaced parallel relation, a bellcrank mounted at its apex on the frame for vertical swinging movement, means urging one leg portion of the bellcrank against a form supported on the frame, and a tool supported on the other leg portion of said bellcrank and engaging a work piece supported on the frame.

9. The combination of claim 8, and a motor operatively connected to the tool for rotating the latter.

10. The combination of claim 8, and an abrasive belt adapted to engage a work piece supported on the carriage, and means responsive to swinging of the bellcrank for tensioning the belt.

11. The combination of claim 10, wherein said belt includes a vertical flight, said tensioning means including upper and lower rollers mounted on the said other leg portion of said bellcrank.

12. In a wood working machine including a frame and a horizontally movable carriage slidably mounted on the frame and including means for supporting a form and a work piece in spaced parallel relation, a bellcrank mounted at its apex on the frame for vertical swinging movement, means urging one leg portion of the bellcrank against a form supported on the frame, a power driven screw threadedly connected to the carriage and rotatably supported on the frame for moving the carriage, means drivingly connecting the screw to the holding means, and a sanding head rotatably supported on the said other leg portion of said bellcrank.

CALEB L. MOORE.

No references cited.